United States Patent [19]

Neustaedter

[11] Patent Number: 4,956,771
[45] Date of Patent: Sep. 11, 1990

[54] METHOD FOR INTER-PROCESSOR DATA TRANSFER

[75] Inventor: Tarl Neustaedter, Ashland, Mass.

[73] Assignee: Prime Computer, Inc., Natick, Mass.

[21] Appl. No.: 198,161

[22] Filed: May 24, 1988

[51] Int. Cl.$^5$ .................. G06F 15/20; G06F 13/00; G06F 12/00
[52] U.S. Cl. ........................ 364/200; 364/900; 364/940; 364/926.3; 364/239; 364/281.7; 364/260; 364/228.5
[58] Field of Search ............... 364/200, 900 MS File, 364/300

[56] References Cited

U.S. PATENT DOCUMENTS

| | | | |
|---|---|---|---|
| 4,320,450 | 3/1982 | Rose et al. | 364/200 |
| 4,449,182 | 5/1984 | Rubinson et al. | 364/200 |
| 4,543,627 | 9/1985 | Schwab | 364/200 |
| 4,604,682 | 8/1986 | Schwan et al. | 364/200 |

Primary Examiner—Michael R. Fleming
Assistant Examiner—Gopal C. Ray
Attorney, Agent, or Firm—Wolf, Greenfield & Sacks

[57] ABSTRACT

A method for transfer of data between multiple tasks in a host computer and multiple tasks in an intelligent controller. One or more memory buffers for holding the data to be transferred are allocated to each task. Each connection between corresponding tasks in the host and the controller is provided with a set of queues for controlling access by the controller to the memory buffers. An output queue contains descriptions of output buffers holding data for transfer from the host to the controller. A buffer queue contains descriptions of input buffers available for transfer of data from the controller to the host, a return queue contains descriptions of output buffers available for transfer of data from the host to the controller, and an input queue contains descriptions of input buffers holding data that has been transferred from the controller to the host. The queues contain pointers to extended control blocks, each containing a virtual data pointer and a physical data pointer to a specified buffer. When data is to be transferred, a description of a selected buffer is provided to the controller. When the controller has resources available, the host is notified and a description of the selected buffer is provided to the host. The host maps the selected buffer to an I/O segment of virtual memory, and the transfer of data is performed through the I/O segment. After completion of the data transfer, the description of the buffer is placed on the appropriate queue for reuse in a subsequent data transfer.

22 Claims, 8 Drawing Sheets

| | 56 | 57 | 58 | | | |
|---|---|---|---|---|---|---|
| 44 → | DATA COUNT | VIRTUAL DATA POINTER | PPN PHYS DATA POINTER | MBZ! —— | RESRVD FOR CNTRLR | RESRVD FOR PRIMOS |
| | 0 | 1-2 | 3-4 | 5 | 6 | 7 |

FIG. 4

| | 63 | 64 | 65 | 66 | 67 | 68 | | | |
|---|---|---|---|---|---|---|---|---|---|
| | DATA VER-SION | # CONN ECTS | # INT VECS | PTR 1ST IVEC | SIZE OF IVEC | PTR 1ST IVAR | SIZE OF IVAR | IOB # | PTR TO INITIAL SEMAFOR | (RESERVED) |
| | 0 | 1 | 2 | 3 | 4 | 5 | 6 | 7 | 10-11 | 12-17 |

60 →

| IO SEG WINDOW #1 | | IO SEG WINDOW #2 | | IO SEG WINDOW #3 | | IO SEG WINDOW #4 | |
|---|---|---|---|---|---|---|---|
| PTR TO MAPSLOT | VIRTUAL ADDRESS | PTR TO MAPSLOT | VIRTUAL ADDRESS | PTR TO MAPSLOT | VIRTUAL ADDRESS | PTR TO MAPSLOT | VIRTUAL ADDRESS |
| 20-21 | 22-23 | 24-25 | 26-27 | 30-31 | 32-33 | 34-35 | 36-37 |

FIG. 5

| | 70 | 71 | 72 | 73 | 74 | 75 | 76 | 77 | 78 | 79 |
|---|---|---|---|---|---|---|---|---|---|---|
| 61 → | DEV. # | CONN # | BUFF SIZE | —— LCN —— | INPUT DONE SEMAFR | OUTPUT DONE SEMAFR | INQ POINTER | OUTQ POINTER | BUFQ POINTER | RTNQ POINTER |
| | 0 | 1 | 2 | 3 | 4-5 | 6-7 | 10-11 | 12-13 | 14-15 | 16-17 |

FIG. 6

METHOD FOR INTER-PROCESSOR DATA TRANSFER

FIELD OF THE INVENTION

This invention relates to methods for communication between a host computer and an intelligent controller and, more particularly, to efficient methods for queued communication between multiple tasks on a host computer and multiple tasks on a controller.

BACKGROUND OF THE INVENTION

Host computers are typically interfaced to communication networks through an intelligent controller The controller offloads from the host much of the work associated with network communication so that the host is freed for other work. At any given time, the host may have in process several tasks requiring network communication, and the controller has corresponding tasks. Blocks of data must be transferred between tasks in the host and tasks in the controller in either direction. When data for a specified task is received on the network, the task in the controller must forward the data to the corresponding task in the host. Similarly, when a particular task in the host has data ready for transmission on the network, it is forwarded to the corresponding task in the controller. It is necessary that the transfer of data between multiple tasks in the host and multiple tasks in the controller be performed in an efficient, high-speed and noninterfering manner. Furthermore, the transfer should be performed with a minimum of host involvement.

It is desirable to utilize direct memory access (DMA) transfers of data between the host and the controller in order to achieve high speed. One limiting factor in performing DMA transfers is that the host typically has a larger address space than the controller. The controller may have a 16-bit address, while the host may have an address of 28 bits or more. Therefore, the controller can access only a segment, usually called an I/O segment, of the host virtual memory space. In order to transfer data from the controller to a specified page in the host memory or to transfer data from a specified page in the host memory to the controller, it is necessary for the host to map the specified page to virtual memory location that is accessible to the controller This mapping process, known as "windowing," is typically performed under host control. Consequently, in prior systems the data transfer took place at the time specified by the host, and in the order specified by the host.

It is a general object of the present invention to provide improved methods of communication between a host computer and an intelligent controller.

It is another object of the present invention to provide methods of efficient, noninterfering communication between multiple tasks on a host computer and multiple tasks on an intelligent controller.

It is a further object of the present invention to provide methods for communication between multiple tasks on a host computer and multiple tasks on a controller wherein the time and order of data transfer are determined by the controller.

It is yet another object of the present invention to provide methods for communication between multiple tasks on a host computer and multiple tasks on a controller utilizing direct memory access transfers.

It is a further object of the present invention to provide methods for communication between multiple tasks on a host computer and multiple tasks on a controller with a minimum of host computer involvement.

SUMMARY OF THE INVENTION

According to the present invention, these and other objects and advantages are achieved in a method for efficient transfer of data between a plurality of tasks in a host computer and a corresponding plurality of tasks in an intelligent controller. Each host task and the corresponding controller task have a software connection between them. The host computer includes a virtual memory and an I/O segment of virtual memory. According to the data transfer method of the invention, one or more memory buffers for holding the data to be transferred are allocated to each connection between tasks. Associated with each connection is a set of queues including an output queue of descriptions of output buffers containing data ready for transfer from the host computer to the controller, a buffer queue of descriptions of input buffers available for transfer of data from the controller to the host computer, a return queue of descriptions of output buffers available for transfer of data from the host computer to the controller, and an input queue of descriptions of input buffers containing data that has been transferred from the controller to the host computer. The queues contain pointers to extended control blocks, each containing a virtual data pointer to a specified buffer, a physical data pointer to the specified buffer and a data count indicating the size of the buffer.

When data is to be transferred from a host computer task to the corresponding controller task, a description of an output buffer is read from the return queue associated with that task, the data is written into the selected output buffer, a description of the selected output buffer is written on the associated output queue and the controller is notified of activity on the associated output queue. At a time when the controller has resources available, the controller notifies the host computer that it is ready for the data transfer and provides a description of the selected output buffer. The description includes the virtual data pointer and the physical data pointer. In response to the notification from the controller, the host computer maps the selected output buffer into an I/O window in the I/O segment of virtual memory. The data is then read by the controller from the selected output buffer through the I/O window. After completion of the data transfer, the description of the output buffer is written on the return queue so that the output buffer can be reused for subsequent data transfers.

When data is to be transferred from a controller task to a host computer task, a description of an input buffer is read by the controller from the buffer queue associated with that task. The host computer is notified when the controller is ready for the data transfer, and the description of the selected input buffer is provided to the host computer. The description includes the virtual data pointer and the physical data pointer. In response to the notification from the controller, the host computer maps the selected input buffer into an I/O window in the I/O segment of virtual memory. The data is then written by the controller to the selected input buffer through the I/O window. After completion of the data transfer, the host task transfers the description of the input buffer from the input queue to the buffer queue for reuse by the controller in a subsequent data transfer.

The data transfer method of the present invention provides efficient, noninterfering communication between multiple tasks with a minimum of host computer involvement. The controller determines the time and order of data transfer based on priorities and available resources. The controller indentifies the buffer to be transferred by means of a virtual data pointer and a physical data pointer. The host computer, upon request from the controller, maps the selected buffer to an I/O window in the I/O segment of virtual memory. The controller can then read or write in the selected buffer through the I/O window.

BRIEF DESCRIPTION OF THE DRAWINGS

For a better understanding of the present invention together with other and further objects, advantages and capabilities thereof, reference is made to the accompanying drawings which are incorporated herein by reference and in which.

DETAILED DESCRIPTION OF THE INVENTION

In accordance with the present invention, there is provided a method for communication between multiple tasks, or processes, on a host computer and multiple tasks, or processes, on an intelligent controller. Each host task communicates with a corresponding task in the controller. The software communication link between each host task and each controller task is referred to as a connection. Data can be transferred between the host and the controller in either direction. Data is transferred from a specified sending task to the corresponding task at the receiving end. One or more data buffers are assigned to each connection. The buffers can be located anywhere in memory. When data is to be transferred in either direction, a specified buffer is mapped to the I/O segment of memory and the data is transferred to or from the buffer through a window in the I/O segment. Mapping and data transfer are controlled by the controller.

Pointers to buffers containing the data to be transferred and pointers to buffers available to receive data are stored in queues. A separate set of queues is associated with each connection between tasks. Tasks in the host can read and write items on the queues with queue instructions, and the controller can read and write items on the queues with queued data transfer operations. A communication program controls transfer of data between the host and the controller as described hereinafter.

Figure 1A:
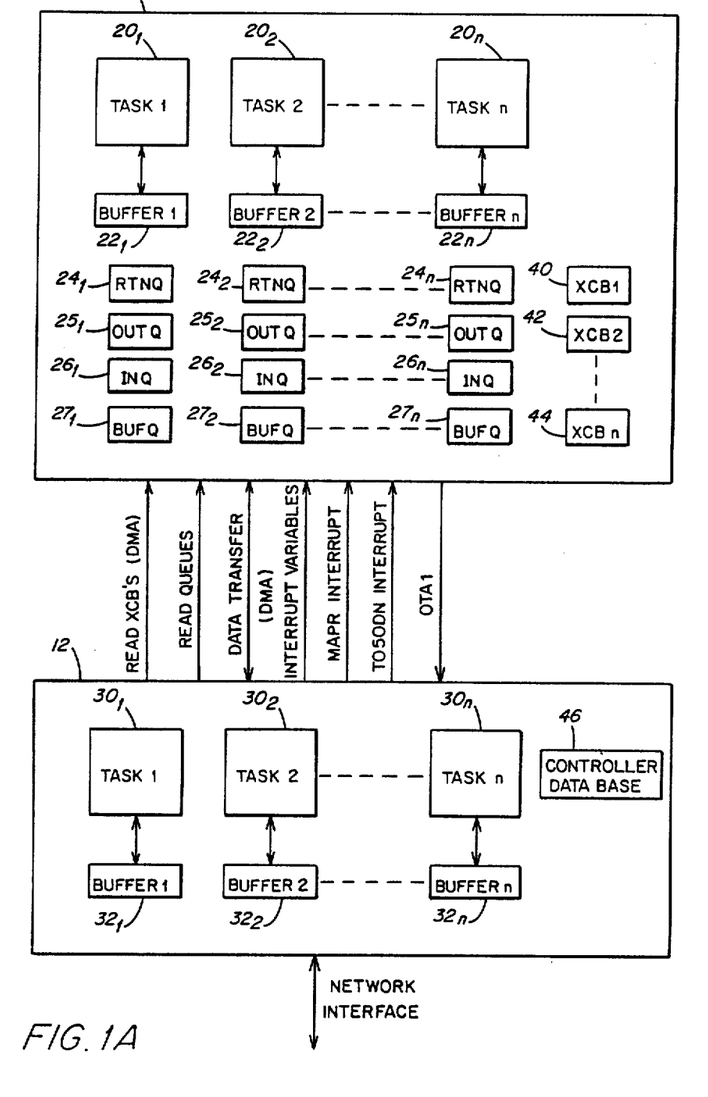
FIG. 1A is a simplified block diagram that illustrates a host computer and an intelligent controller.

A simplified block diagram that illustrates communication between a host computer 10 and an intelligent controller 12 is shown in FIG. 1A. An example of a host computer suitable for implementation of the present invention is a Model 6350 sold by Prime Computer, Inc. An example of a suitable controller 12 is a Model LHC300 sold by Prime Computer, Inc. The host 10 includes tasks $20_1$, $20_2$,-$20_n$ that are operating concurrently or at different times. At least one memory buffer is associated with each task in the host 10. Buffer $22_1$ is associated with task $20_1$, buffer $22_2$ is associated with task $20_2$, etc. The buffers can be located in any part of virtual memory. Tasks $20_1$, $20_2$,-$20_n$ communicate with corresponding tasks $30_1$, $30_2$,-$30_n$ in the controller 12. Task $20_1$ is linked to task $30_1$, task $20_2$ is linked to task $30_2$, etc. As noted above, the software links between corresponding tasks are known as connections. At least one memory buffer is associated with each task in the controller 12. Buffer $32_1$ is associated with task $30_1$, buffer $32_2$ is associated with task $30_2$, etc.

Associated with each connection between tasks are four queues used during communication as described hereinafter. Associated with the connection between task $20_1$ and task $30_1$ are a return queue $24_1$, an output queue $25_1$, an input queue $26_1$ and a buffer queue $27_1$. A similar set of queues is associated with each connection between tasks. The queues contain pointers to extended control blocks (XCB's) 40, 42 and 44 in the host 10, as described hereinafter, and each extended control block points to one of the buffers. While three XCB's are shown in FIG. 1A, it will be understood that there is one XCB for each buffer. A database 46 in the controller 12 contains information used in establishing communication between tasks in the host and tasks in the controller. The elements shown in FIG. 1A represent various data structures associated with inter-processor communication as described hereinafter.

Figure 1B:
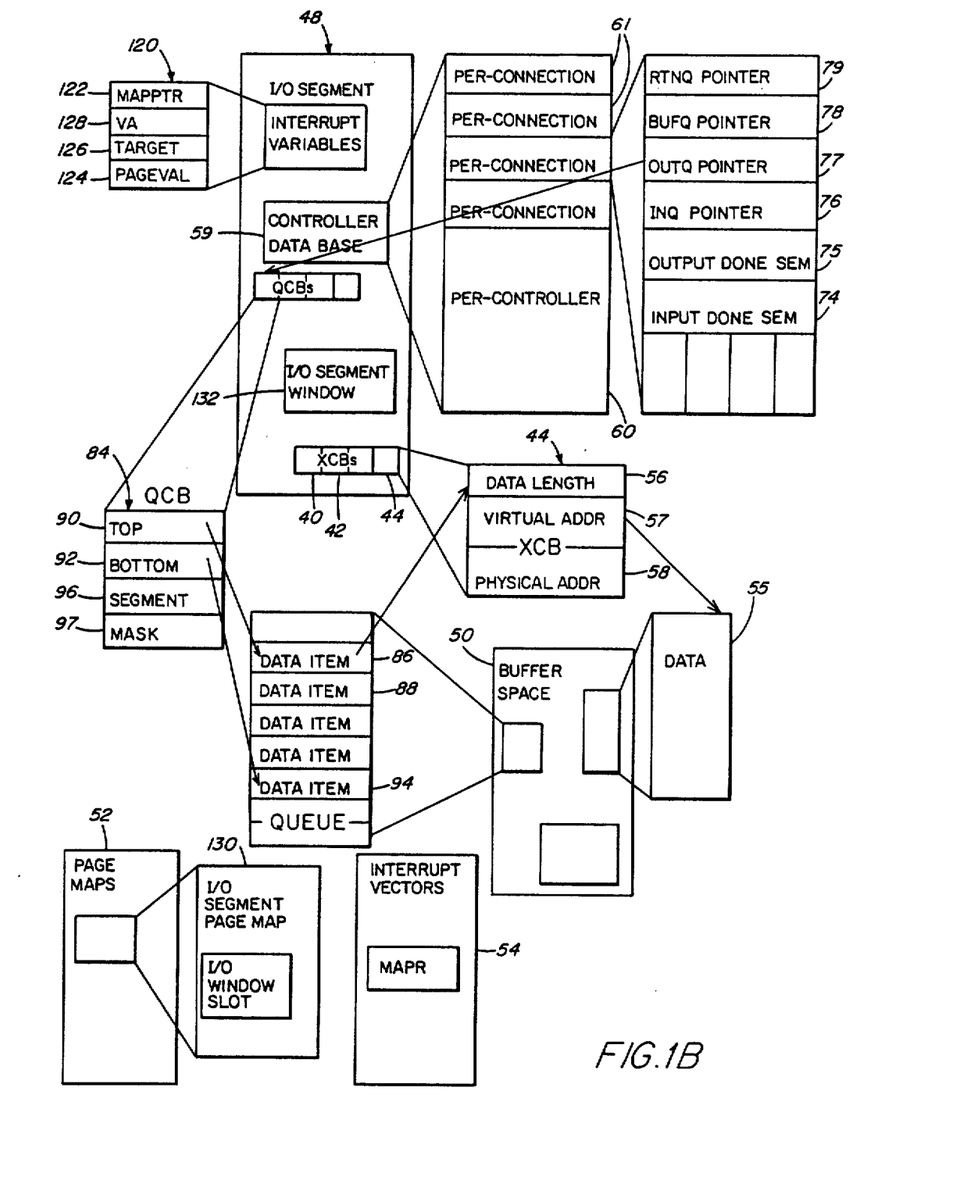
FIG. 1B is a block diagram that illustrates the host computer data structures associated with communication between the host computer and the intelligent controller.

The host data structures associated with communication between the host 10 and the controller 12 are illustrated in more detail in FIG. 1B. An I/O segment 48 is the segment of the host virtual memory that can be accessed by the controller 12. A buffer space 50 contains the buffers to be transferred between the host and the controller and may be located anywhere in virtual memory. Page maps 52 are used for mapping buffer space 50 to the I/O segment 48, as described hereinafter. Interrupt vectors 54, utilized in the transfer of data, are also located outside the I/O segment 48. These data structures are described in detail hereinafter.

As noted above, each connection between a task in the host and a task in the controller has four queues associated with it. (1) The input queue (INQ) is a queue of buffers that have been transferred by the controller 12 to the host 10. (2) The output queue (OUTQ) is a queue of buffers that are ready to be transferred from the host 10 to the controller 12. (3) The buffer queue (BUFQ) is a queue of buffers available for use by the controller 12. When the host 10 receives a buffer on the input queue INQ, it later puts the buffer on the buffer queue BUFQ so the controller 12 can use it again (4) The return queue (RTNQ) is a queue of buffers available for use by the host 10. When the controller 12 receives a buffer from the output queue OUTQ, it later places it on the return queue RTNQ.

Figure 4:
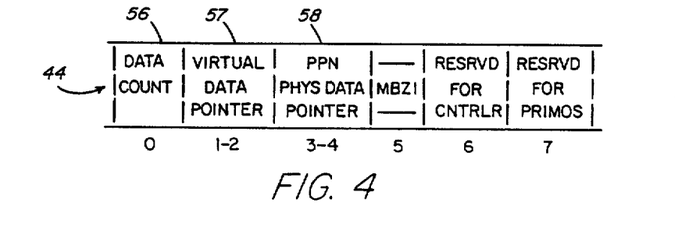
FIG. 4 illustrates the data structure of the extended control block (XCB) used for buffer manipulations.

Each nonempty queue contains pointers to the extended control blocks (XCB's) 40, 42, 44 each of which points to a buffer 55 (FIG. 1B). The buffer is a page in memory that contains a specified block of data or is available for receiving a block of data. All buffer manipulations are done through pointers to the XCB's. The XCB is allocated at the time a buffer is provided to the communication program and is associated with that buffer until it leaves the communication program. The XCB is read and written by the controller by DMA. As shown in FIGS. 1B and 4, the XCB contains a data count 56 indicating the number of bytes that have been written into the data buffer, a virtual data pointer 57 to the data buffer used by the calling task and a physical data pointer 58 which is the physical page number of the data and is used in windowing the data.

When the host initiates communication with the controller, an OTA1 command is sent to the controller. The OTA1 command contains a 16-bit address of the output queue that contains an item for transfer to the controller.

The controller uses two types of interrupt in communicating with the host. Prior to each interrupt, specified interrupt variables are forwarded to the host. A MAPR interrupt causes the host to map a specified buffer into an I/O window in the I/O segment of memory. A T050DN interrupt notifies the host that a specified data transfer is complete.

When the controller is initialized, the host sends an OTA13 command to the controller. The OTA13 command contains a pointer to a master controller database 59 in the I/O segment 48 of the host memory. The controller reads the database and verifies it. The database is a block of data divided into sub-blocks of sixteen words. The first two sub-blocks of sixteen words are a per-controller database 60 (FIG. 1B) where information common to a specified controller is stored. The third and further sub-blocks of sixteen words are per-connection databases 61 and contain information relevant to specified connections between host tasks and controller tasks.

Figure 5:
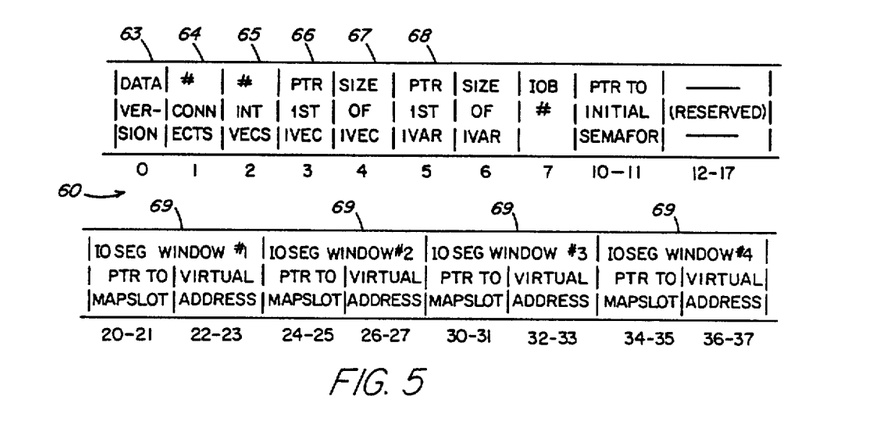
FIG. 5 illustrates the data structure of the per-controller database.

The per-controller database 60 (shown in FIG. 5) contains information necessary for the DMA transfer, such as pointers to I/O segment windows, and pointers to interrupt vectors. The following data fields are contained in the per-controller database. (1) Data version 63 permits the database configuration to be changed without requiring compatibility with earlier versions. If the data version does not match what the controller expects, subsequent initialization will fail. (2) Number of connections 64 indicates how may 16 word per-connection databases follow the per-controller database. If the number is less than what the controller expects, subsequent initialization will fail. (3) Number of interrupt vectors 65 gives the number of consecutive interrupt vectors allocated to the controller. (4) Pointer to first interrupt vector 66 is an offset pointer to the block of memory where the two interrupt vectors, MAPR and T050DN, are located. This vector points to the start of the first block. The T050DN vector starts at the first word of the block, and the MAPR vector starts four words later. (5) Size of interrupt vector 67 gives offset from the first interrupt vector to the next interrupt vector, if any. (6) Pointer to first interrupt variable block 68 is a compressed pointer to a block of memory in an I/O segment where the variables for the interrupt vectors are located. (7) I/O segment windows 69 are four blocks of four words each describing the I/O segment windows allocated to the controller. The first two words in each block are a pointer to the page map slot, and the second two words in each block are the virtual address that represents the I/O segment window, i.e., the start of the page where the buffers are to be mapped.

Figure 6:
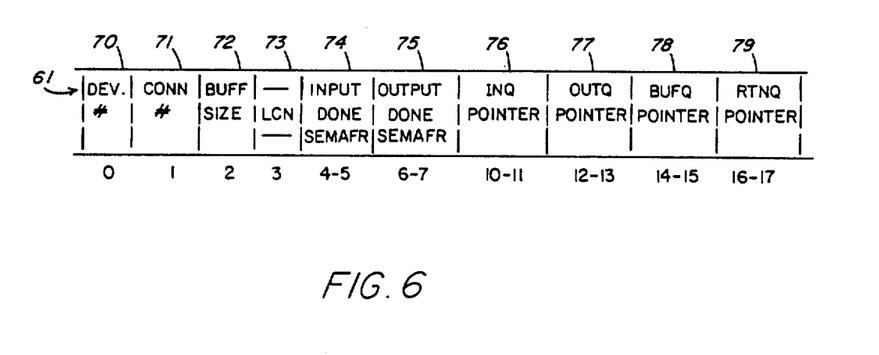
FIG. 6 illustrates the data structure of the per-connection database.

The per-connection database 61 (shown in FIG. 6) contains pointers to queues specific to each connection and data useful to the host when using the connection. The per-connection database 61 includes the following data fields: (1) Device number 70 is an identifying number utilized by the host. (2) Connection number 71 is the sequence number of the connection. When at OTA is sent to the controller, the connection number is loaded into the A register. (3) Buffer size 72 describes the size in bytes of the buffers on the buffer queue (BUFQ). The controller should never write more than this number of bytes into a buffer. (4) Logical connection number (LCN) 73 is the name of the connection to be used during initialization. The name is written into the per-connection database by the controller during initialization and is used by the host to identify the connection. (5) Input done semaphore 74 is a pointer to a semaphore to notify when the input queue has gone from empty to nonempty as a result of the controller putting an item on the input queue. When this pointer is zero, no notify is performed. (6) Output done semaphore 75 is a pointer to a semaphore to notify when the return queue (RTNQ) has gone from empty to nonempty as a result of an item from the controller. When the pointer is zero, no notify is performed. (7) INQ pointer 76 is a pointer to an input queue. Messages sent from a controller task to a host task are placed on the input queue. (8) OUTQ pointer 77 is a pointer to an output queue. Messages to be sent from a host task to a controller task are placed on the output queue. (9) BUFQ pointer 78 is a pointer to a queue of buffers available for use by the controller. When the host receives a buffer on the input queue, it later places it back on the BUFQ so that the controller can use it again. (10) RTNQ pointer 79 is a pointer to a queue of buffers the controller has removed from the output queue (OUTQ) and no longer needs. Host tasks sending messages to the controller obtain buffers from the return queue.

Each of the above-described queues includes a queue control block (QCB) 84 and a number of data items 86, 88, etc. that constitute the queue. The queue control block 84 includes a top pointer 90 that points to the data item 86 on the top of the queue and a bottom pointer 92 that points to a data item 94 on the bottom of the queue. Thus, data items are removed from the top of the queue by use of the top pointer 90, and data items are added to the bottom of the queue by use of the bottom pointer 92. The queue control block 84 also includes a segment number 96 and a mask 97.

Figure 2A:
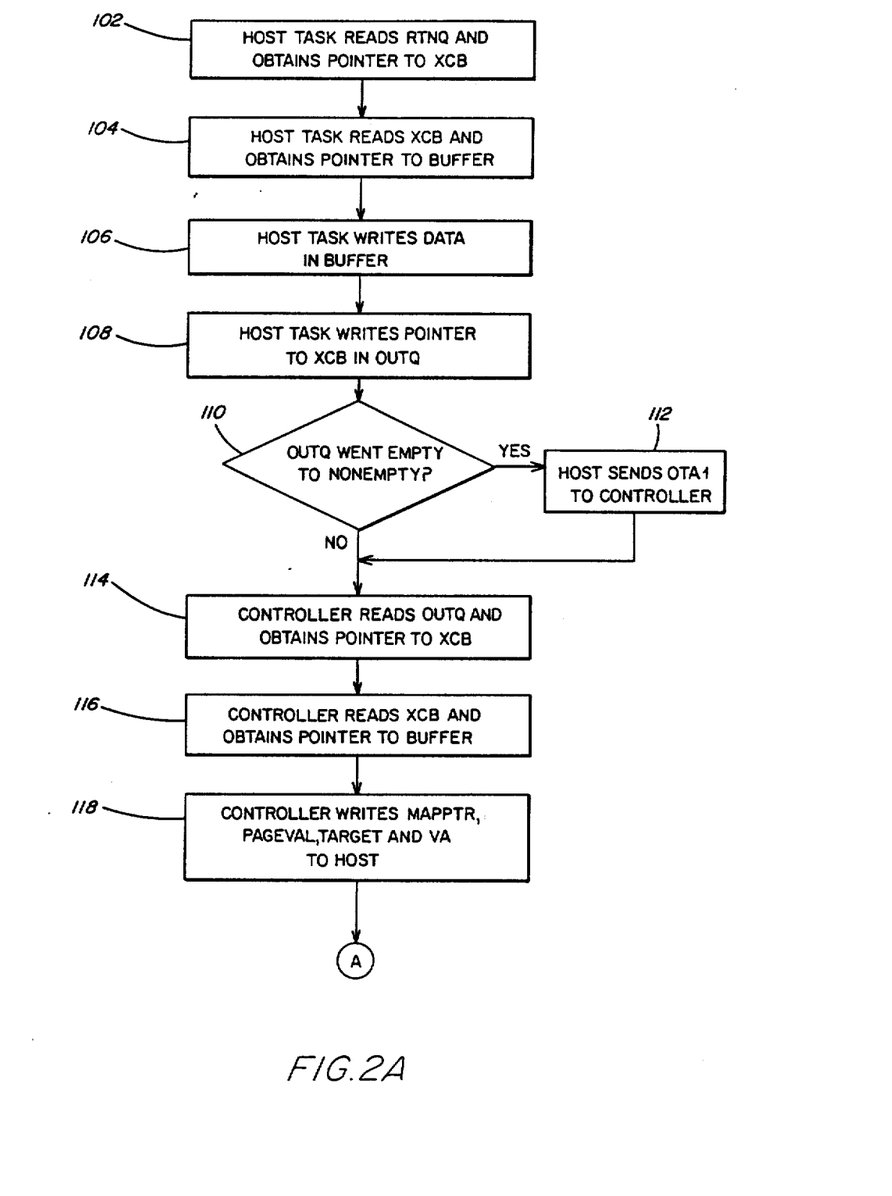
FIGS. 2A-2C are flow diagrams that illustrate host-to-controller communication.
Figure 2B:
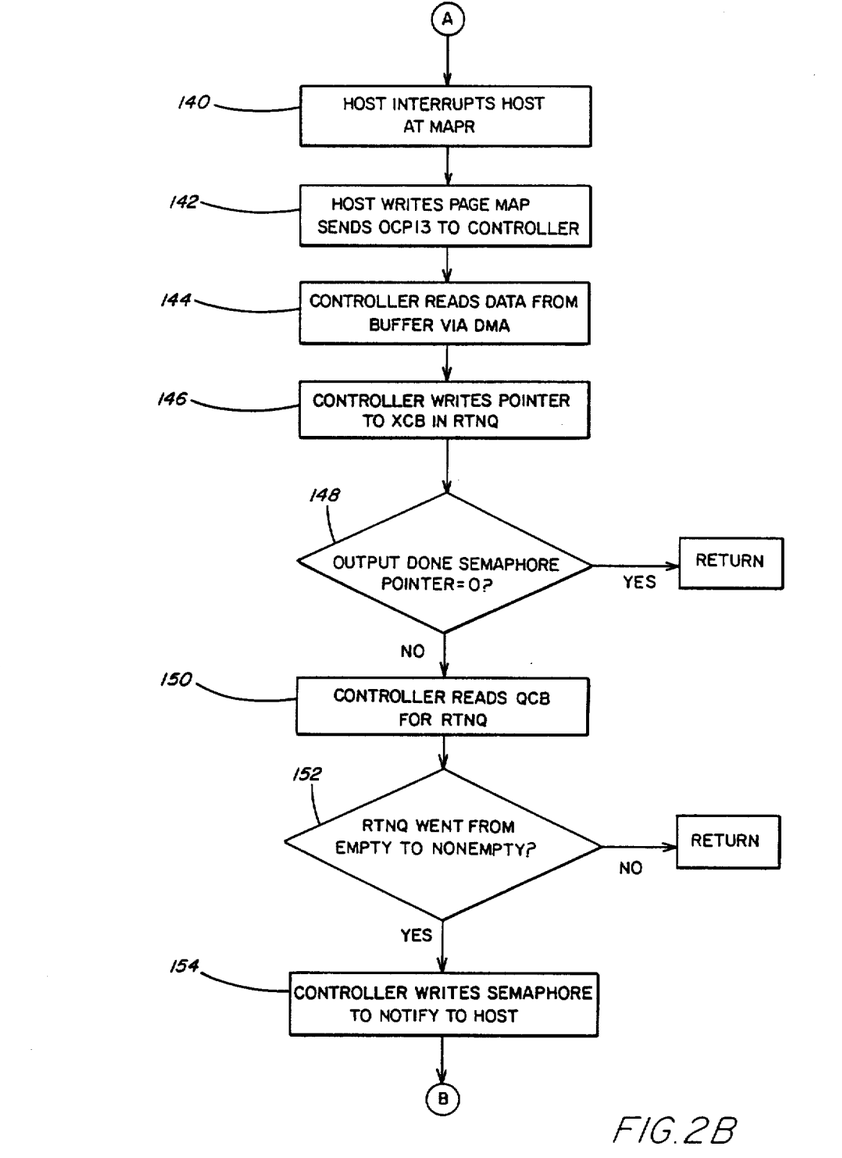
Figure 2C:
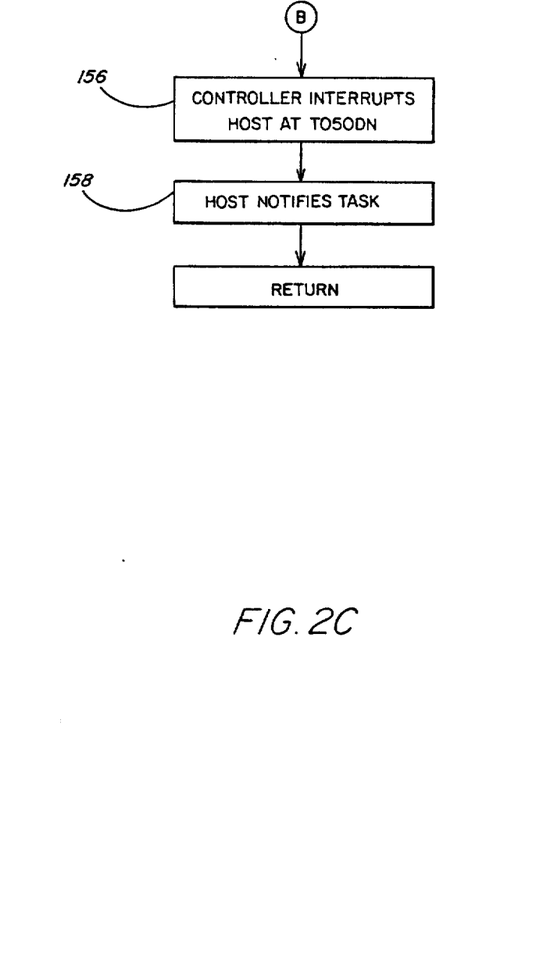

The transfer of data from the host to the controller is illustrated with reference to FIGS. 2A-2C. Initially, a task being run on the host and having data for transfer to the controller allocates a buffer by taking a pointer to an XCB from the return queue RTNQ for that task (step 102). The task reads the XCB and obtains a pointer to a buffer (step 104). The data is written by the host task into the buffer specified by the XCB pointer (step 106), and the pointer is added to the bottom of the output queue OUTQ for that connection (step 108). If the associated output queue went from empty to nonempty (step 110), as determined from the queue control block QCB, an OTA1 command is sent to the controller in step 112.

The OTA1 command notifies the controller that a buffer is ready for transfer, and the sixteen-bit value in the A register identifies the output queue OUTQ that has an item for transfer. If the output queue OUTQ did not go from empty to nonempty when the new item was added to it, then other items are waiting on the same queue. In this case, the controller was previously notified by an OTA1 command that was sent when the OUTQ first went from empty to nonempty, and an OTA1 command is not necessary.

In response to the OTA1 command and when the controller has resources available, the controller reads the output queue OUTQ for the specified connection and obtains the pointer to the extended control block XCB in step 114. The controller then reads the extended control block XCB using direct memory access in step 116. As noted above, the XCB is located in the I/O segment 48 of memory and contains a virtual data pointer 57 to the data buffer 55 used by the calling task, a physical data pointer 58 and a data count 56 indicating the number of bytes written into the data buffer 55. The controller picks an I/O segment window from the available I/O segment windows specified in the per-controller database 60 and writes interrupt variables (step 118) into an interrupt variable block 120 (see FIG. 1B) corresponding to the MAPR interrupt.

The interrupt variables include MAPPTR 122, PAGEVAL 124, TARGET 126 and VA 128. MAPPTR 122 is the pointer to a page map slot 130 that defines a window 132 in an I/O segment specified by the controller. The controller obtains the value of MAPPTR from the I/O segment window field of the per-controller database PAGEVAL 124 is the value to be written into the page map slot 130. The controller obtains the value of PAGEVAL from the physical page number field 58 of the extended control block, XCB. TARGET 126 is the normal virtual address of the buffer 55. The controller obtains the value of TARGET from the virtual address field 57 of the extended control block, XCB. VA 128 is the desired virtual address in segment zero. The controller obtains the value of VA from the I/O segment window field of the per-controller database.

When these values have been written into the interrupt block, the controller requests a MAPR interrupt (step 140) for performing I/O segment mapping. The MAPR interrupt in step 142 causes the host to write the page map and to load the I/O translation lookaside buffer using the values MAPPTR, PAGEVAL, TARGET and VA supplied by the controller. After the mapping process, the buffer to be transferred is visible, or windowed, to the controller through the I/O segment 48 of memory. The host sends an OCP13 command to notify the controller that the page mapping is complete. The controller in step 144 reads the buffer 55 through I/O window 132 of I/O segment 48 using direct memory access transfer. When the buffer read is complete, the controller writes a pointer to the XCB on the return queue RTNQ (step 146) for the corresponding connection. The buffer is then available for reuse by the host task.

The controller then checks the output done semaphore pointer in step 148. The output done semaphore pointer indicates whether the sending task in the host requires notification that the data transfer is complete. If the output done semaphore pointer is zero, no notification is required, and the data transfer is complete. If the output done semaphore pointer is not zero, the controller reads the queue control block QCB in step 150 and determines if the return queue RTNQ went from empty to nonempty (step 152). If the return queue did not go from empty to nonempty, the data transfer is complete.

If the corresponding return queue (RTNQ) went from empty to nonempty, the controller writes the semaphore to notify into the interrupt variable block for the T050DN interrupt (step 154) and requests a T050DN interrupt (step 156). In response to the T050DN interrupt, the host notifies the task that there is activity on the return queue RTNQ (step 158).

When the data transfer is complete, the controller returns to the beginning of the data transfer process and checks the output queue OUTQ of the same connection. If additional items are on OUTQ, they are processed in the same manner as described above.

Figure 3A:
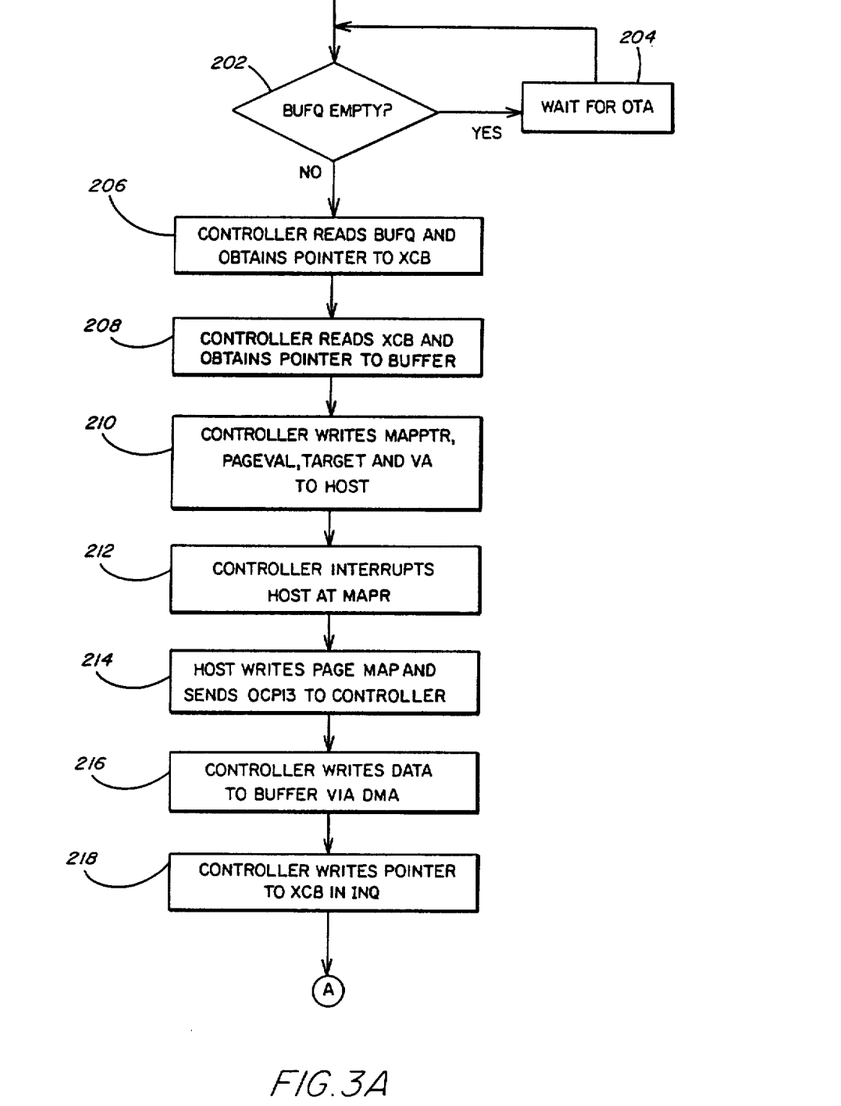
FIGS. 3A and 3B are flow diagrams that illustrate controller-to-host communication.
Figure 3B:
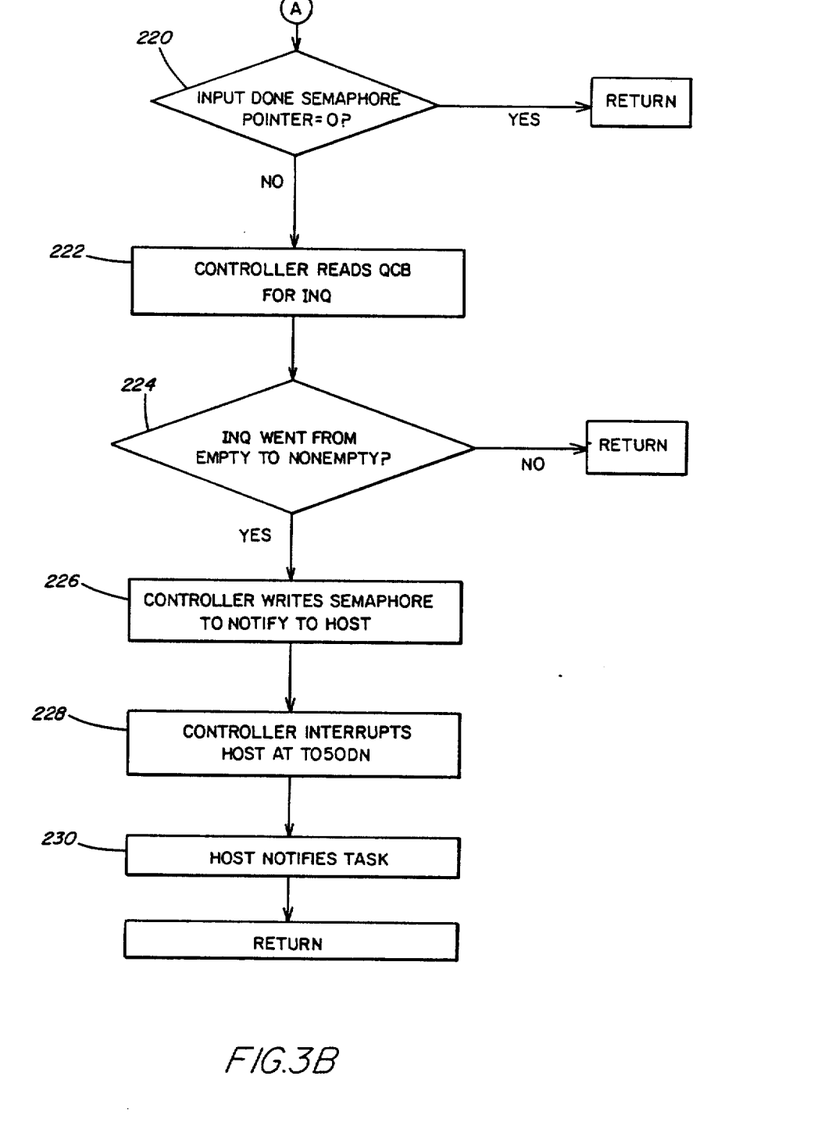

The detailed operation for transfer of data from the controller to the host is described with reference to FIGS. 3A and 3B. Such data transfer is asynchronous with host operations, since data can be received from the communication network at any time. The data is transferred through a specified connection to a specified task in the host. When data is ready for transfer to the host, the controller checks the buffer queue BUFQ of the appropriate connection in step 202. If the buffer queue is empty, the controller must wait until an OTA command is received from the host (step 204), indicating a nonempty buffer queue for that connection. If a buffer is available on BUFQ, the controller reads BUFQ and obtains a pointer to an XCB (step 206). The controller reads the XCB identified by the BUFQ from the I/O segment 48 using direct memory access (step 208).

The controller then selects an I/O segment window from the I/O segment windows available in the per-controller database 60 and writes the interrupt variables PAGEVAL 124, MAPPTR 122, TARGET 126 and VA 128 in the interrupt variable block for the MAPR interrupt (step 210). These variables are obtained in the same manner as for the case described above when the host is transferring data to the controller MAPPTR 122 is obtained from the I/O segment window field of the per-controller database 60, PAGEVAL 124 is obtained from the physical page number field 58 of the XCB, TARGET 126 is obtained from the virtual address field 57 of the XCB and VA 128 is obtained from the I/O segment window field of the per-controller database 60. The controller then forwards a MAPR interrupt request to the host (step 212).

In response to the MAPR interrupt, the host writes the page map 130 for mapping the specified buffer 55 to the I/O segment window 132 specified by the interrupt variables and loads the I/O translation lookaside buffer (step 214). Upon completion of the page mapping, the host sends an OCP13 command to the controller. The controller in step 216 writes the data into the buffer through the I/O window 132 using direct memory access. The controller then writes the pointer to the extended control block XCB to the input queue INQ for the corresponding connection (step 218).

The controller checks the input done semaphore in step 220. The input done semaphore pointer indicates whether the receiving task in the host requires notification that the data transfer is complete. If the input done semaphore pointer is zero, no notification is required and the data transfer is complete. If the input done semaphore pointer is not zero, the controller reads the queue control block QCB in step 222 and determines if the input queue INQ for the associated task went from empty to nonempty (step 224). If the input queue INQ did not go from empty to nonempty, the data transfer is complete. If the input queue INQ went from empty to nonempty, the controller writes the semaphore to notify into the interrupt variable block for the T050DN interrupt (step 226) and forwards a T050DN interrupt to the host (step 228). The host in step 230 notifies the corresponding task that a buffer has been received and is waiting. After the associated task receives the data, it transfers the buffer from the input queue INQ to the buffer queue BUFQ for reuse by the controller.

When the data transfer is complete, the controller returns to the beginning of the data transfer process. If additional data is waiting to be transferred from the controller to the host on the same connection, the controller checks the associated buffer queue BUFQ for available buffers. The additional data is transferred in the same manner as described above.

The process for initializing the communication program in the controller will now be described. The controller communication program is downline loaded from the host. After the program is loaded into the controller, the host sends an OTA13 command to the controller with the A register containing a pointer to the start of the per-controller database 60. The controller reads the per-controller database 60 and compares the data against what it expects. If the controller determines that the database is invalid, an error code is set in a specified register in the host. Then the controller reads the per-connection database 61 and compares the data against what it expects. If the per-connection databases 61 are zero (not initialized), the controller writes the logical connection number it expects into the logical connection number fields for each per-connection database. If the databases have already been initialized in a previous download to the controller, the controller checks the logical connection numbers in the database against what it expects. If any do not match, the controller sets an error in the specified host register. If all of the checks are successful, the controller places a zero in the specified host register. The initialization process in the host, after waiting a specified time, checks the specified host register. If the value is zero, the controller program is running. If any other value is found, the controller program did not initialize, and the operating system is notified.

A description of data transfer on a single connection from the host to the controller has been described. In addition, data transfer on a single connection from the controller to the host has been described. It will be understood that at any given time, data can be awaiting transfer from the host to the controller on one or more output queues, and data can be awaiting transfer from the controller to the host on one or more connections. The various connections are prioritized in the controller so that the multiple data blocks can be transferred in an orderly manner. In a preferred embodiment, the controller continues to transfer the items on a selected queue consecutively until the queue is empty. The controller then proceeds to the queue of next highest priority and transfers the items on that queue until it is empty. If, during the processing of the items on a first queue, no buffers are available for that connection, then the controller proceeds to a second queue of next highest priority. The controller returns to the first queue to complete data transfer at a later time when buffers are available. It can be seen that the data transfer in both directions is under the control of the controller.

It will be understood that other priority schemes can be utilized within the scope of the present invention. For example, when the controller is processing data items on one queue and an item is added to a queue of higher priority, the controller can complete the item on which it is working and then shift to processing of the items on the higher priority queue.

The buffer transfer method described above permits the controller to determine the order of buffer transfer and the time of buffer transfer. If the controller does not have resources available when the host has data ready to transfer, the controller simply waits until a later time to read the output queue OUTQ to obtain a pointer to the XCB. Similarly, when data is received on the communication network, the controller determines the time at which the data is transferred to the host. Since all information regarding the buffer is forwarded by the controller to the host in the MAPR interrupt variables, the order of data transfer can be selected by the controller. The windowing of buffers through the I/O segment, although performed by the host, is under control of the controller through the MAPR interrupt. Therefore, data transfer between multiple tasks in the host and multiple tasks in the controller is accomplished with a minimum of host involvement.

While there has been shown and described what is at present considered the preferred embodiments of the present invention, it will be obvious to those skilled in the art that various changes and modifications may be made therein without departing from the scope of the invention as defined by the appended claims.

What is claimed is:

1. In a computer system comprising a host computer coupled to an intelligent controller, said host computer including a virtual memory, said virtual memory including an I/O segment, a method for transferring data between a plurality of tasks being executed in the host computer and a corresponding plurality of tasks being executed in the controller, each pair of corresponding tasks in the host computer and the controller having a logical connection therebetween, said method comprising the steps of:

said host computer allocating to each connection one or more memory buffers for holding said data;

said host computer providing for each connection an output queue for queueing descriptions of output buffers containing data ready for transfer from the host computer to the controller;

said host computer providing for each connection a buffer queue for queueing descriptions of input buffers available for transfer of data from the controller to the host computer;

for each host computer task having data for transfer to said controller, said host computer writing the data to a selected output buffer, writing a description of the selected output buffer on the associated output queue, and notifying the controller of activity on the associated output queue;

for each controller task having data for transfer to said host computer, said controller reading a description of a selected input buffer from the associated buffer queue;

for each data transfer, said controller forwarding the description of the selected output buffer or the selected input buffer from the controller to the host computer;

for each data transfer, said host computer mapping the selected output buffer or the selected input buffer to the I/O segment of virtual memory;

said controller reading the selected output buffer through said I/O segment; and said controller writing to the selected input buffer through said I/O segment and notifying the associated task that data has been written in the selected input buffer.

2. A method for transferring data as defined in claim 1 wherein the step of said host computer providing an output queue for queueing descriptions of output buffers includes the step of said host computer queueing pointers to virtual data pointers to said output buffers and physical data pointers to said output buffers.

3. A method for transferring data as described in claim 2 wherein the step of said host computer providing a buffer queue for queueing descriptions of input buffers includes the step of said host computer queueing pointers to virtual data pointers to said input buffers and physical data pointers to said input buffers, 4. A method for transferring data as described in claim 3 wherein the step of said controller forwarding the description of the buffer from the controller to the host includes the steps of said controller writing the virtual data pointer and the physical data pointer of the selected input buffer or the selected output buffer in a specified interrupt variable block of the host computer and interrupt the host computer to request mapping of the output buffer or the input buffer to the I/O segment of virtual memory.

5. A method for transferring data as defined in claim 1 further including the steps of said host computer providing for each connection a return queue for queuing descriptions of output buffers available for receiving data from the associated host computer task, said host computer reading a description of the selected output buffer from the return queue when the associated host computer task has data ready for transfer, and said controller placing a description of the selected output buffer on the return queue after the data has been transferred from the host computer to the controller.

6. A method for transferring data as defined in claim 5 further including the step of said host computer providing for each connection an input queue for queueing descriptions of input buffers into which data has been transferred from the controller and wherein the step of said controller notifying the associated task that data has been written in the selected input buffer includes the step of said controller writing a description of the selected input buffer on the associated input queue.

7. A method for transferring data as defined in claim 6 further including the step of said host computer transferring the description of the selected input buffer from the input queue to the buffer queue after the associated task has been notified that data has been written in the selected input buffer.

8. A method for transferring data as defined in claim 1 wherein the step of said host computer providing an output queue for queueing descriptions of output buffers includes the step of said host computer queueing pointers to extended control blocks, each containing a virtual data pointer to a specified output buffer and a physical data pointer to the specified output buffer.

9. A method for transferring data as defined in claim 8 wherein the step of said host computer providing a buffer queue for queueing descriptions of input buffers includes the step of said host computer queueing pointers to extended control blocks, each containing a virtual data pointer to a specified input buffer and a physical data pointer to the specified input buffer.

10. In a computer system comprising a host computer coupled to an intelligent controller, said host computer including a virtual memory, said virtual memory including an I/O segment, a method for transferring data from a plurality of tasks being executed in the host computer to a corresponding plurality of tasks being executed in the controller, each pair of corresponding tasks in the host computer and the controller having a connection therebetween, said method comprising the steps of:

said host computer allocating to each connection one or more memory buffers for holding said data;

for each host computer task having data for transfer to said controller, said host computer writing the data in a selected output buffer;

said host computer notifying the controller that data has been written in the selected output buffer and providing a description of the selected output buffer;

said controller notifying the host computer when the controller is ready for data transfer and providing a description of the selected output buffer;

said host computer, in response to the notification from the controller, mapping the selected output buffer to the I/O segment of virtual memory; and said controller reading the selected output buffer through the I/O segment.

11. A method for transferring data as defined in claim 10 wherein the step of said host computer notifying the controller that has been written in the selected output buffer and providing a description of the selected output buffer includes the steps of said host computer providing for each connection an output queue for queueing descriptions of output buffers containing data ready for transfer from the host computer to the controller, said host computer writing the description of the selected output buffer on the associated output queue, and said host computer notifying the controller that an item is on the associated output queue if the associated output queue went from empty to nonempty.

12. A method for transferring data as defined in claim 11 wherein the step of said host computer providing an output queue for queueing descriptions of output buffers includes the step of said host computer queueing pointers to extended control blocks, each containing a virtual data pointer to a specified output buffer and a physical data pointer to the specified output buffer.

13. A method for transferring data as defined in claim 11 further including the steps of said host computer providing for each connection a return queue for queueing descriptions of output buffers available for receiving data from the associated host computer task, said host computer reading a description of the selected output buffer from the return queue when the associated host computer task has data ready for transfer, and said controller placing a description of the selected output buffer on the return queue after the data has been transferred from the host computer to the controller.

14. In a computer system comprising a host computer coupled to an intelligent controller, said host computer including a virtual memory, said virtual memory including an I/O segment, a method for transferring data from a plurality of tasks being executed in the controller to a corresponding plurality of tasks being executed in the host computer, each pair of corresponding tasks in the host computer and the controller having a connection therebetween, said method comprising the steps of:
said host computer allocating to each connection one or more memory buffers for holding said data;
said host computer providing for each connection descriptions of input buffers available for transfer of data from the controller to the host computer;
said controller notifying the host computer when the controller is ready for data transfer and providing a description of a selected input buffer;
said host computer, in response to the notification from the controller, mapping the selected input buffer to the I/O segment of virtual memory; and
said controller writing to the selected input buffer through said I/O segment and notifying the associated task that data has been written in the selected input buffer.

15. A method for transferring data as defined in claim 14 wherein the step of said host computer providing for each connection descriptions of input buffers available for transfer of data from the controller to the host computer includes the steps of
said host computer providing for each connection a buffer queue for queueing descriptions of input buffers available for transfer of data from the controller to the host computer, and
said controller reading a description of the selected input buffer from the associated buffer queue.

16. A method for transferring data as defined in claim 15 wherein the step of said host computer providing a buffer queue for queueing descriptions of input buffers includes the step of said host computer queueing pointers to extended control blocks, each containing a virtual data pointer to a specified input buffer and a physical data pointer to the specified input buffer.

17. A method for transferring data as defined in claim 16 wherein the step of said controller notifying the host computer when the controller is ready for data transfer and providing a description of a selected input buffer includes the steps of said controller writing the virtual data pointer and the physical data pointer of the selected input buffer in a specified interrupt variable block of the host computer and interrupting the host computer to request mapping of the selected input buffer to the I/O segment of virtual memory.

18. A method for transferring data as defined in claim 17 further including the step of said host computer providing for each connection an input queue for queueing descriptions of input buffers into which data has been transferred from the controller and wherein the step of said controller notifying the associated task that data has been written in the selected input buffer includes the step of said controller writing a description of the selected input buffer on the associated input queue.

19. In a computer system comprising a host computer coupled to an intelligent controller, said host computer including a virtual memory, said virtual memory including an I/O segment, a method for transferring data between a plurality of tasks being executed in the host computer and a corresponding plurality of tasks being executed in the controller, each pair of corresponding tasks in the host computer and the controller having a connection therebetween, said method comprising the steps of:
said host computer allocating to each connection one or more memory buffers for holding the data to be transferred;
said host computer providing for each connection an output queue of descriptions of output buffers containing data ready for transfer from the host computer to the controller;
said host computer providing for each connection a buffer queue of descriptions of input buffers available for transfer of data from the controller to the host computer;
said host computer providing for each connection a return queue of descriptions of output buffers available for transfer of data from the host computer to the controller;
said host computer providing for each connection an input queue of descriptions of input buffers containing data that has been transferred from the controller to the host computer;
for each host computer task having data for transfer to the controller, said host computer
reading a description of a selected output buffer from the return queue,
writing data to the selected output buffer,
writing a description of the selected output buffer on the associated output queue, and
notifying the controller of activity on the associated output queue;
for each controller task having data for transfer to the host computer, said controller reading a description of a selected input buffer from the associated buffer queue;
for each data transfer, said controller notifying the host computer when the controller is ready for data transfer and providing a description of the selected buffer to be utilized for data transfer;
in response to the notification from the controller, said host computer mapping the selected buffer into the I/O segment of virtual memory; and
said controller performing the data transfer to or from the selected buffer through the I/O segment of virtual memory.

20. A method for transferring data as defined in claim 19 wherein the step of said host computer providing an output queue for queueing descriptions of output buffers includes the step of said host computer queueing pointers to extended control blocks, each containing a virtual data pointer to a specified output buffer and a physical data pointer to the specified output buffer.

21. A method for transferring data as defined in claim 20 wherein the step of said host computer providing a buffer queue for queueing descriptions of input buffers includes the step of said host computer queueing pointers to extended controls blocks, each containing a virtual data pointer to a specified input buffer and a physical data pointer to the specified input buffer.

22. In a computer system comprising a host computer coupled to an intelligent controller, said host computer including a virtual memory, said virtual memory including an I/O segment, a method for transferring data between a plurality of tasks being executed in the host computer and a corresponding plurality of tasks being executed in the controller, each pair of corresponding tasks in the host computer and the controller having a connection therebetween, said method comprising the steps of:
- said host computer allocating too each connection one or more virtual memory buffers for holding the data to be transferred;
- said host computer providing to the controller descriptions of buffers containing data ready for transfer from the host computer to the controller and descriptions of buffers available for transfer of data from the controller to the host computer;
- said controller notifying the host computer when the controller is ready for transfer of data and providing a description of the buffer to be utilized for data transfer;
- said host computer, in response to the notification from the controller, mapping the buffer to be utilized for data transfer into the I/O segment of virtual memory based on the description provided by the controller; and
- said controller transferring the data to or from the buffer to be utilized for data transfer through the I/O segment of virtual memory.

* * * * *